（12）United States Patent
Sugiyama et al.

(10) Patent No.: US 12,519,286 B2
(45) Date of Patent: Jan. 6, 2026

(54) QUANTUM CASCADE LASER ELEMENT AND QUANTUM CASCADE LASER DEVICE

(71) Applicant: HAMAMATSU PHOTONICS K.K., Hamamatsu (JP)

(72) Inventors: Atsushi Sugiyama, Hamamatsu (JP); Kousuke Shibata, Hamamatsu (JP); Takahide Ochiai, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 654 days.

(21) Appl. No.: 17/914,828

(22) PCT Filed: Mar. 26, 2021

(86) PCT No.: PCT/JP2021/012900
§ 371 (c)(1),
(2) Date: Sep. 27, 2022

(87) PCT Pub. No.: WO2021/200670
PCT Pub. Date: Oct. 7, 2021

(65) Prior Publication Data
US 2023/0142086 A1    May 11, 2023

(30) Foreign Application Priority Data
Apr. 2, 2020 (JP) .................. 2020-066828

(51) Int. Cl.
H01S 5/34    (2006.01)
H01S 5/028    (2006.01)

(52) U.S. Cl.
CPC ............ H01S 5/028 (2013.01); H01S 5/3401 (2013.01)

(58) Field of Classification Search
CPC ...... H01S 5/028; H01S 5/3401; H01S 5/0282; H01S 5/02335; H01S 5/0234; H01S 5/04252; H01S 5/04254
See application file for complete search history.

(56) References Cited

U.S. PATENT DOCUMENTS

2015/0070698 A1* 3/2015 Muraviev ............. H01S 3/1392
                                                        356/451
2018/0366911 A1* 12/2018 Yoshinaga ............. H01S 5/227
(Continued)

FOREIGN PATENT DOCUMENTS

JP    S61-292390 A    12/1986
JP    S63-033888 A    2/1988
(Continued)

OTHER PUBLICATIONS

International Preliminary Report on Patentability mailed Oct. 13, 2022 for PCT/JP2021/012900.

Primary Examiner — Xinning(Tom) Niu
Assistant Examiner — Delma R Forde
(74) Attorney, Agent, or Firm — Faegre Drinker Biddle & Reath LLP

(57) ABSTRACT

A quantum cascade laser element includes: a semiconductor substrate; a semiconductor laminate formed on the semiconductor substrate to include an active layer having a quantum cascade structure and to have a first end surface and a second end surface facing each other in a light waveguide direction; a first electrode; a second electrode; an insulating film continuously formed from the second end surface to a region on a second end surface side of at least one surface of a surface on an opposite side of the first electrode from the semiconductor laminate and a surface on an opposite side of the second electrode from the semiconductor substrate; and a metal film formed on the insulating film to cover at least the active layer when viewed in the light waveguide direc- (Continued)

tion. An outer edge of the metal film does not reach the one surface when viewed in the light waveguide direction.

10 Claims, 9 Drawing Sheets

(56) References Cited

U.S. PATENT DOCUMENTS

| | | | |
|---|---|---|---|
| 2018/0375292 A1* | 12/2018 | Hashimoto | H01S 5/3401 |
| 2019/0074664 A1* | 3/2019 | Ito | H01S 5/028 |
| 2023/0133283 A1* | 5/2023 | Sugiyama | H01S 5/04256 |
| | | | 372/45.01 |
| 2023/0291180 A1* | 9/2023 | Sugiyama | H01S 5/04252 |

FOREIGN PATENT DOCUMENTS

| | | |
|---|---|---|
| JP | 2013-254765 A | 12/2013 |
| JP | 2019-009225 A | 1/2019 |
| JP | 2019-009346 A | 1/2019 |
| JP | 2019-047065 A | 3/2019 |

* cited by examiner

Fig.3
(a)
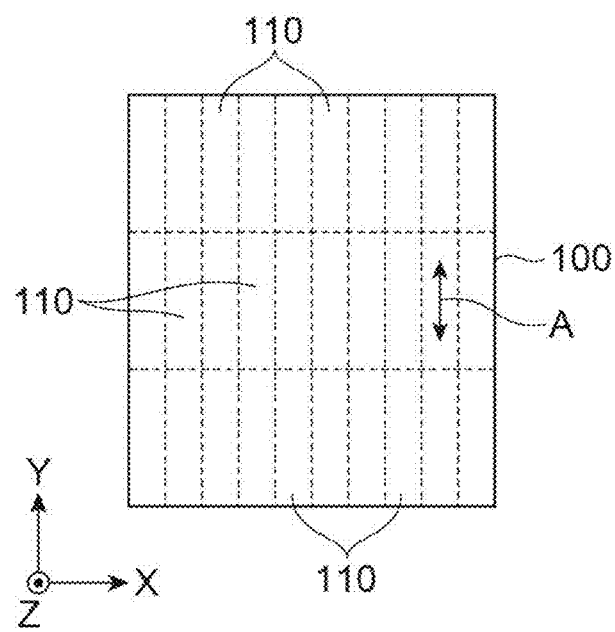
(b)
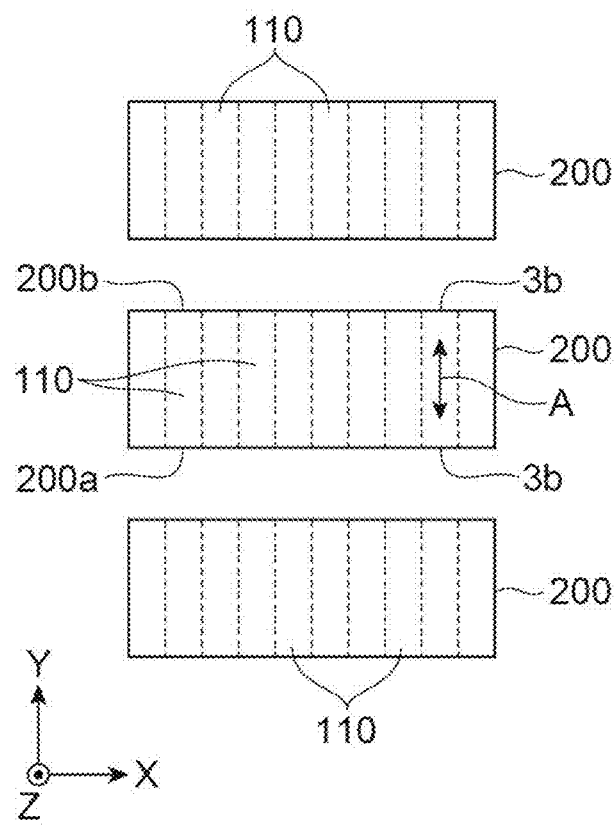

*Fig.4*
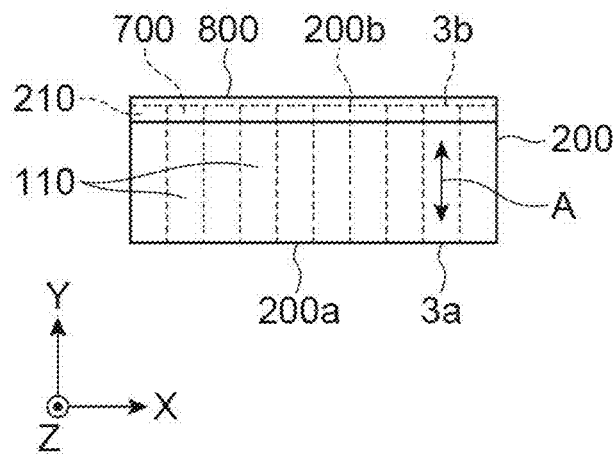
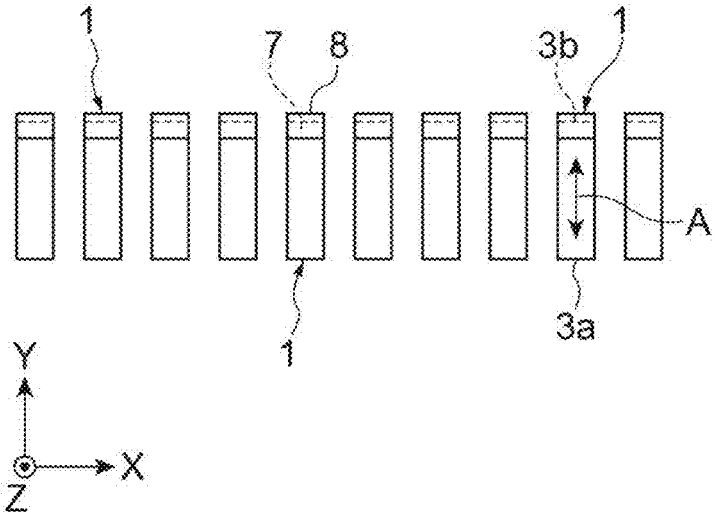

Fig.5
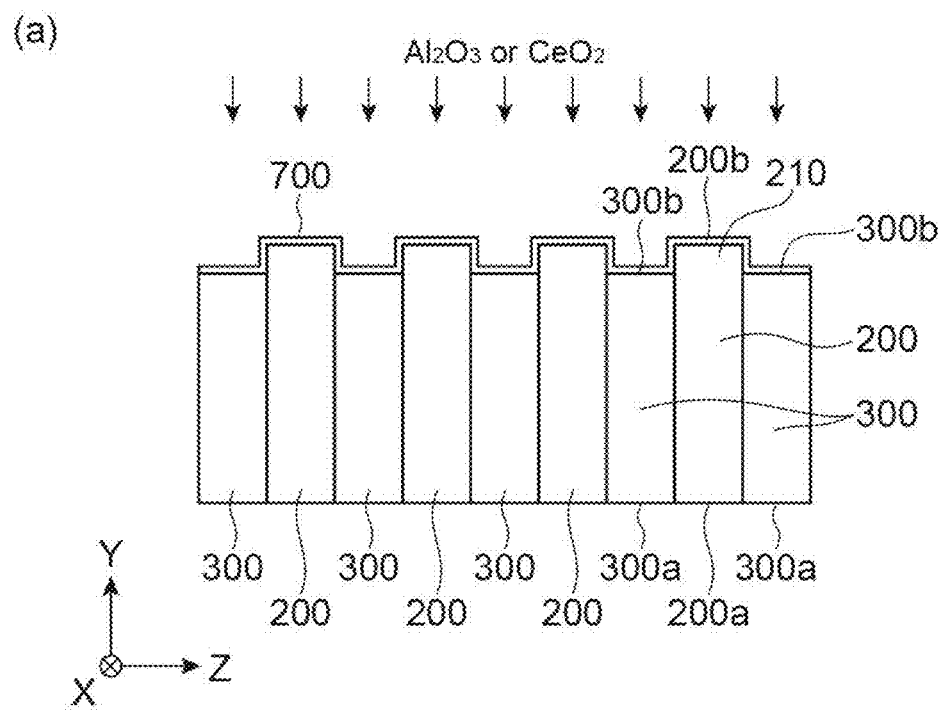
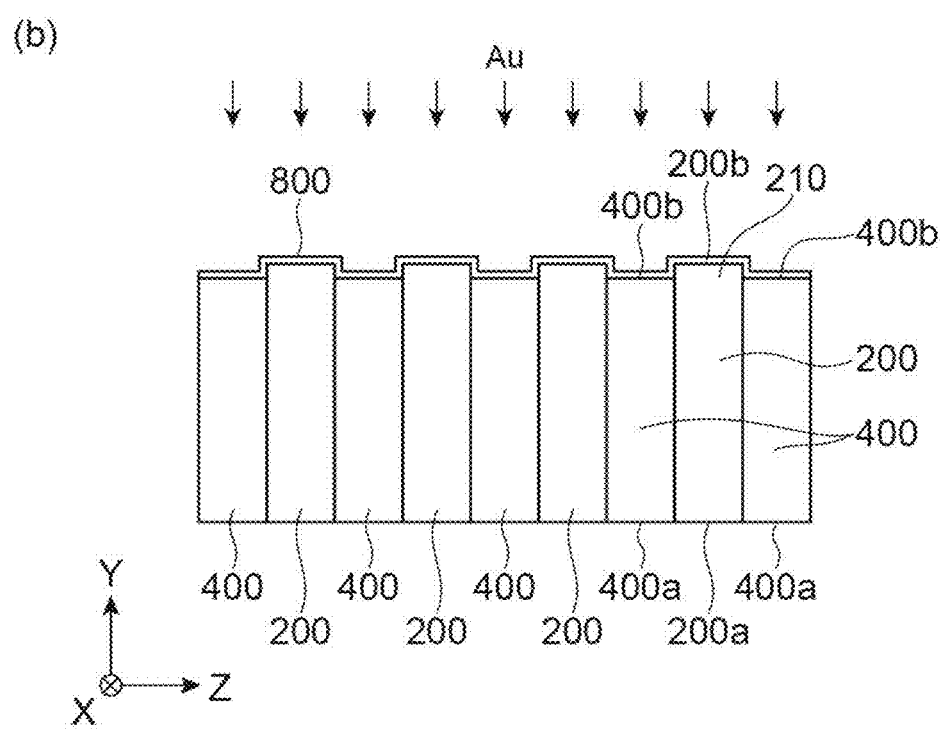

Fig.8
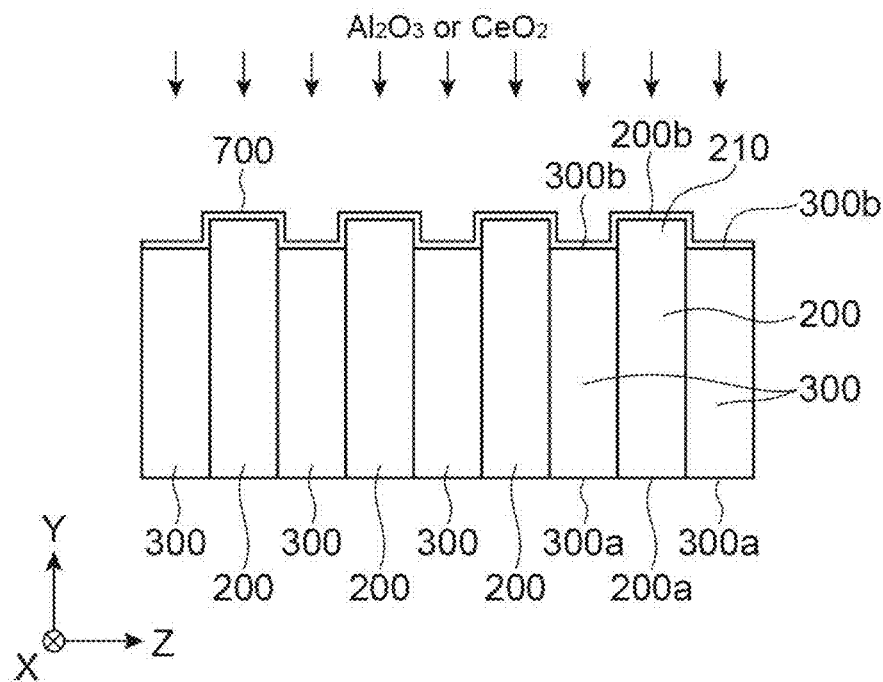
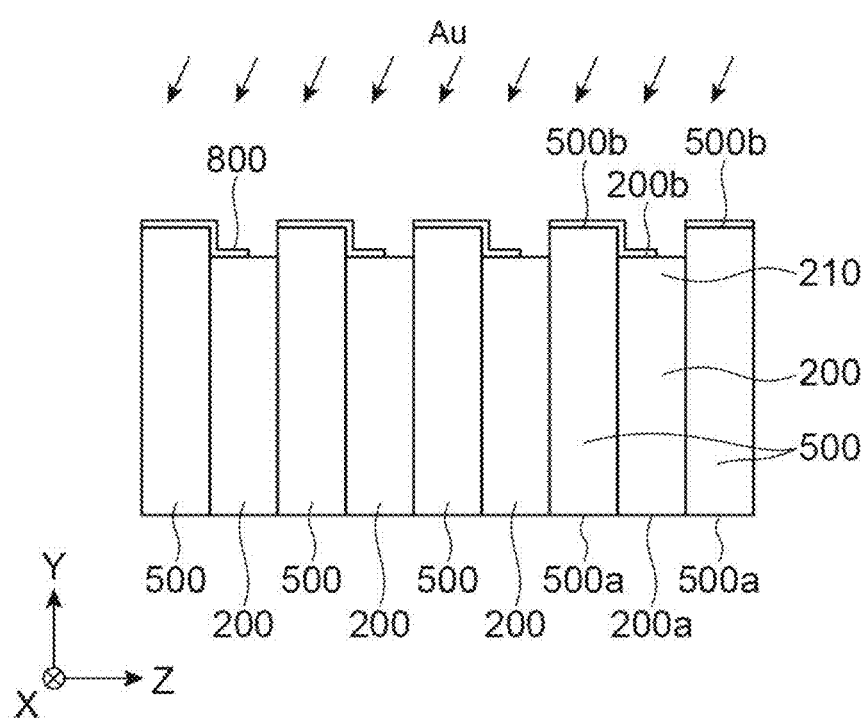

QUANTUM CASCADE LASER ELEMENT AND QUANTUM CASCADE LASER DEVICE

TECHNICAL FIELD

The present disclosure relates to a quantum cascade laser element and a quantum cascade laser device.

BACKGROUND ART

In the related art, a quantum cascade laser element has been known which includes a semiconductor substrate; a semiconductor laminate formed on the semiconductor substrate; a first electrode formed on a surface on an opposite side of the semiconductor laminate from the semiconductor substrate; and a second electrode formed on a surface on an opposite side of the semiconductor substrate from the semiconductor laminate, in which a metal film is formed on one end surface of a pair of end surfaces included in the semiconductor laminate including an active layer, with an insulating film interposed therebetween (for example, refer to Patent Literature 1). In such a quantum cascade laser element, since the other end surface of the pair of end surfaces functions as a light-emitting surface while the metal film functions as a reflection film, an efficient light output can be obtained.

CITATION LIST

Patent Literature

Patent Literature 1: Japanese Unexamined Patent Publication No. 2019-9346

SUMMARY OF INVENTION

Technical Problem

When the above-described quantum cascade laser element is mounted on a support portion such as a sub-mount, the first electrode or the second electrode may be joined to an electrode pad of the support portion using a joining member such as a solder member. In that case, when the joining member adheres to the metal film, a light output characteristic of the quantum cascade laser element degrades, which is a concern. As a countermeasure to the degradation, it is conceived that the metal film is covered with an insulating member such that the joining member does not adhere to the metal film. However, in such a configuration, heat generated in the active layer is likely to be trapped, and as a result, the light output characteristic of the quantum cascade laser element degrades, which is a concern.

An object of the present disclosure is to provide a quantum cascade laser element and a quantum cascade laser device capable of obtaining an efficient light output while suppressing degradation of a light output characteristic.

Solution to Problem

A quantum cascade laser element according to one aspect of the present disclosure includes: a semiconductor substrate; a semiconductor laminate formed on the semiconductor substrate to include an active layer having a quantum cascade structure and to have a first end surface and a second end surface facing each other in a light waveguide direction; a first electrode formed on a surface on an opposite side of the semiconductor laminate from the semiconductor substrate; a second electrode formed on a surface on an opposite side of the semiconductor substrate from the semiconductor laminate; an insulating film continuously formed from the second end surface to a region on a second end surface side of at least one surface of a surface on an opposite side of the first electrode from the semiconductor laminate and a surface on an opposite side of the second electrode from the semiconductor substrate; and a metal film formed on the insulating film to cover at least the active layer when viewed in the light waveguide direction. An outer edge of the metal film does not reach the one surface when viewed in the light waveguide direction.

In the quantum cascade laser element, the metal film is provided on the second end surface of the first end surface and the second end surface included in the semiconductor laminate, with the insulating film interposed therebetween. Accordingly, since the first end surface functions as a light-emitting surface while the metal film functions as a reflection film, an efficient light output is obtained. Further, the insulating film is continuously formed from the second end surface of the semiconductor laminate to the region on the second end surface side of at least one surface of the surface of the first electrode and the surface of the second electrode, and the outer edge of the metal film formed on the insulating film does not reach the one surface (namely, an electrode including a region in which the insulating film is formed (hereinafter, referred to as an "electrode around which the insulating film has wrapped")) when viewed in the light waveguide direction. Accordingly, in order to mount the quantum cascade laser element on a support portion, when the electrode around which the insulating film has wrapped is joined to an electrode pad of the support portion using a joining member, the molten joining member is unlikely to reach the metal film. Moreover, heat generated in the active layer is unlikely to be trapped, for example, as compared to a configuration in which the metal film is covered with an insulating member. For these reasons, the degradation of a light output characteristic of the quantum cascade laser element is suppressed. As described above, according to the quantum cascade laser element, an efficient light output can be obtained while suppressing the degradation of the light output characteristic.

In the quantum cascade laser element according to one aspect of the present disclosure, the semiconductor laminate may include a ridge portion. According to this aspect, by the above-described configuration of the insulating film and the metal film, a reduction in the drive current of the quantum cascade laser element and a reduction in the electric power consumption of the quantum cascade laser element can be achieved while securing an efficient light output. At this time, the light density on each of the first end surface and the second end surface increases by the amount that the active layer is narrowed, but heat dissipation is secured by the above-described configuration of the insulating film and the metal film, so that the degradation of the light output characteristic of the quantum cascade laser element can be suppressed.

In the quantum cascade laser element according to one aspect of the present disclosure, a thickness of a portion of the metal film formed on the second end surface may be larger than a thickness of a portion of the insulating film formed on the second end surface. According to this aspect, heat dissipation on the second end surface on which the insulating film and the metal film are formed can be improved as compared to when the thickness relationship is reversed.

In the quantum cascade laser element according to one aspect of the present disclosure, the insulating film may be continuously formed from the second end surface to at least a region on the second end surface side of the surface of the first electrode, and the outer edge of the metal film may not reach the surface of the first electrode when viewed in the light waveguide direction. According to this aspect, since the first electrode that is an electrode around which the insulating film has wrapped is joined to the electrode pad of the support portion, the active layer can be disposed closer to the support portion as compared to when the second electrode is joined to the electrode pad of the support portion. Therefore, heat generated in the active layer can be efficiently released to a support portion side.

In the quantum cascade laser element according to one aspect of the present disclosure, a thickness of a portion of the first electrode corresponding to the active layer in a thickness direction of the semiconductor substrate may be larger than a thickness of a portion of the metal film formed on the second end surface. According to this aspect, when the first electrode that is an electrode around which the insulating film has wrapped is joined to the electrode pad of the support portion, heat generated in the active layer can be more efficiently released to the support portion side.

In the quantum cascade laser element according to one aspect of the present disclosure, the insulating film may be an $Al_2O_3$ film or a $CeO_2$ film. According to this aspect, since the molten joining member is unlikely to get wet to the insulating film, the molten joining member can be more reliably prevented from reaching the metal film.

A quantum cascade laser device according to one aspect of the present disclosure includes: the quantum cascade laser element; and a drive unit configured to drive the quantum cascade laser element.

According to the quantum cascade laser device, an efficient light output can be obtained while suppressing the degradation of the light output characteristic.

The quantum cascade laser device according to one aspect of the present disclosure may further include a support portion supporting the quantum cascade laser element; and a joining member joining an electrode pad included in the support portion and the first electrode in a state where the semiconductor laminate is located on a support portion side with respect to the semiconductor substrate. The insulating film may be continuously formed from the second end surface to at least a region on the second end surface side of the surface of the first electrode, and the outer edge of the metal film may not reach the surface of the first electrode when viewed in the light waveguide direction. According to this aspect, heat generated in the active layer can be efficiently released to the support portion side.

In the quantum cascade laser device according to one aspect of the present disclosure, a thickness of a portion of the first electrode corresponding to the active layer in a thickness direction of the semiconductor substrate may be larger than a thickness of a portion of the joining member disposed between the electrode pad and the first electrode. According to this aspect, when the quantum cascade laser element is mounted on the support portion, the distance between the outer edge of the metal film and the surface of the first electrode when viewed in the light waveguide direction can be sufficiently secured such that the molten joining member can be more reliably prevented from reaching the metal film.

In the quantum cascade laser device according to one aspect of the present disclosure, the drive unit may drive the quantum cascade laser element such that the quantum cascade laser element continuously oscillates laser light. When the quantum cascade laser element continuously oscillates laser light, the amount of heat generated in the active layer is increased as compared to when the quantum cascade laser element oscillates laser light in a pulsed manner, so that the above-described configuration of the quantum cascade laser element is particularly effective.

Advantageous Effects of Invention

According to the present disclosure, it is possible to provide the quantum cascade laser element and the quantum cascade laser device capable of obtaining an efficient light output while suppressing degradation of a light output characteristic.

BRIEF DESCRIPTION OF DRAWINGS

FIG. 3 is a view showing a method for manufacturing the quantum cascade laser element shown in FIG. 1.

FIG. 4 is a view showing the method for manufacturing the quantum cascade laser element shown in FIG. 1.

FIG. 5 is a view showing the method for manufacturing the quantum cascade laser element shown in FIG. 1.

FIG. 8 is a view showing a method for manufacturing the quantum cascade laser element shown in FIG. 7.

DESCRIPTION OF EMBODIMENTS

Figure 1:
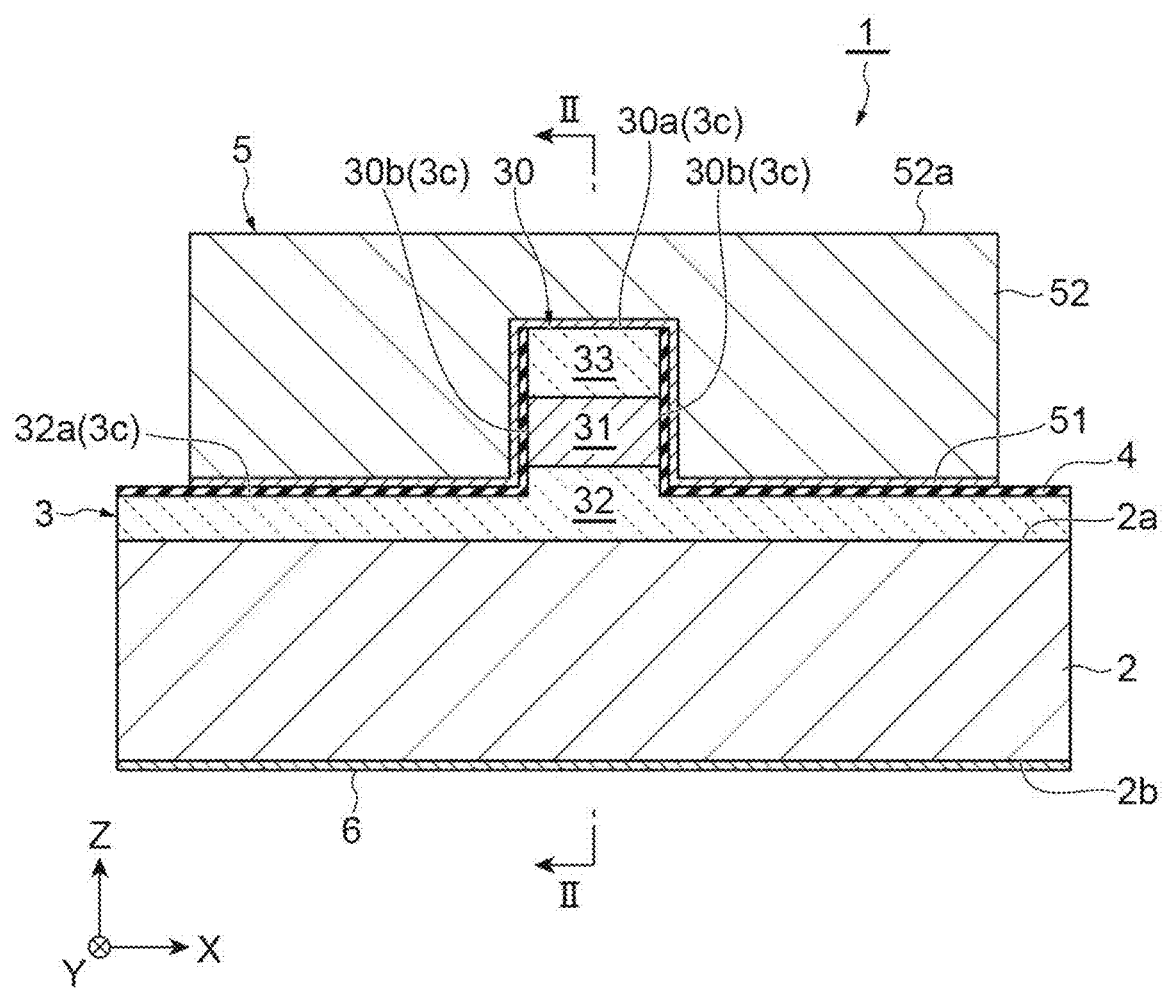
FIG. 1 a cross-sectional view of a quantum cascade laser element of one embodiment.

Hereinafter, embodiments of the present disclosure will be described in detail with reference to the drawings. Incidentally, in the drawings, the same or equivalent portions are denoted by the same reference signs, and a duplicated description will be omitted.

Configuration of Quantum Cascade Laser Element

Figure 2:
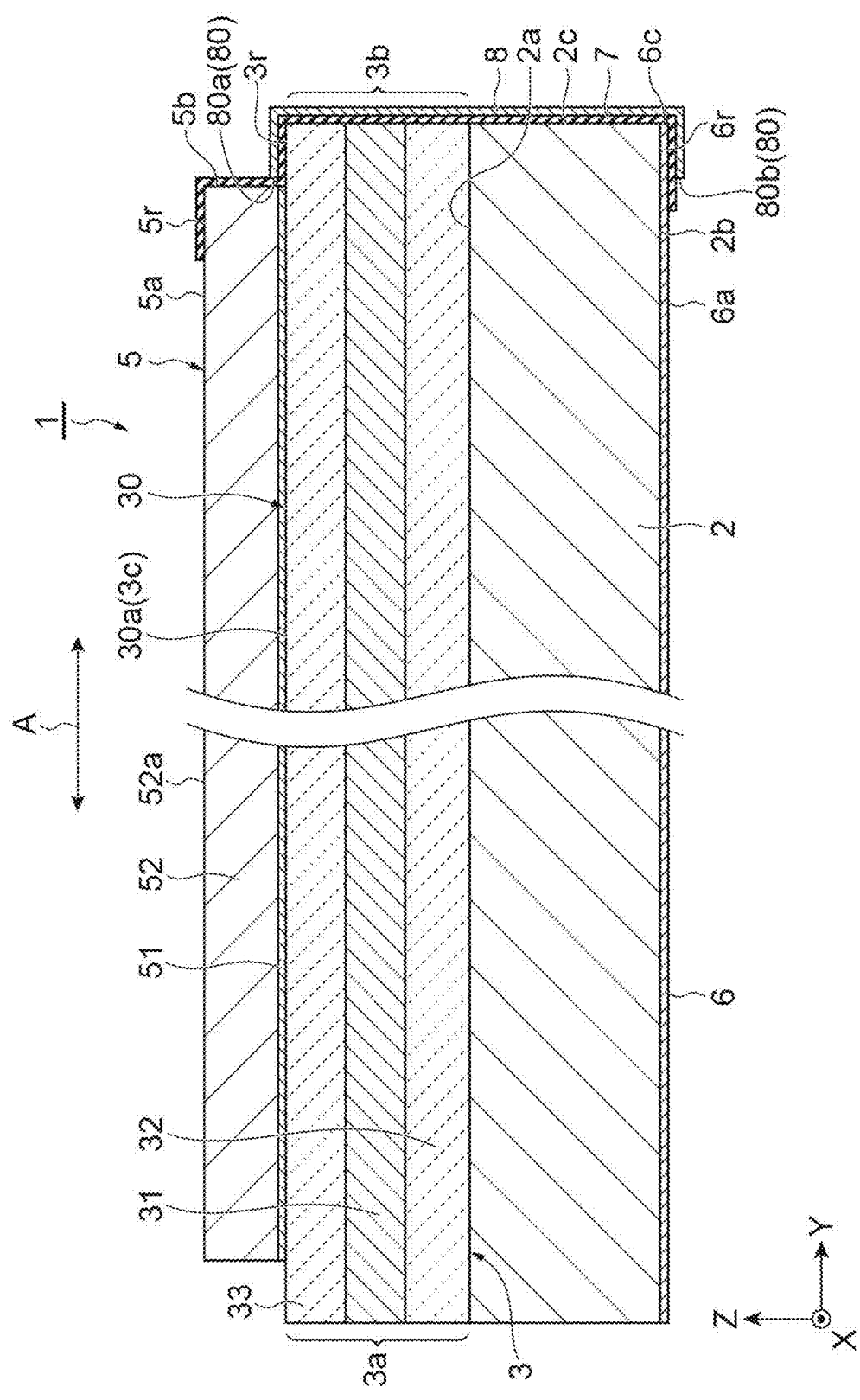
FIG. 2 is a cross-sectional view of the quantum cascade laser element taken along line II-II shown in FIG. 1.

As shown in FIGS. 1 and 2, a quantum cascade laser element 1 includes a semiconductor substrate 2, a semiconductor laminate 3, an insulating film 4, a first electrode 5, a second electrode 6, an insulating film 7, and a metal film 8. The semiconductor substrate 2 is, for example, an S-doped InP single crystal substrate having a rectangular plate shape. As one example, a length of the semiconductor substrate 2 is approximately 2 mm, a width of the semiconductor substrate 2 is approximately 500 μm, and a thickness of the semiconductor substrate 2 is approximately one hundred and several tens of μm. In the following description, a width direction of the semiconductor substrate 2 is referred to as an X-axis direction, a length direction of the semiconductor substrate 2 is referred to as a Y-axis direction, and a thickness direction of the semiconductor substrate 2 is referred to as a Z-axis direction.

The semiconductor laminate 3 is formed on a surface 2a of the semiconductor substrate 2. The semiconductor laminate 3 includes an active layer 31 having a quantum cascade structure. The semiconductor laminate 3 is configured to oscillate laser light having a predetermined center wavelength (for example, a center wavelength of any value of 4 to 11 μm that is a wavelength in a mid-infrared region). In the present embodiment, the semiconductor laminate 3 is formed by stacking a lower cladding layer 32, a lower guide layer (not shown), the active layer 31, an upper guide layer (not shown), an upper cladding layer 33, and a contact layer (not shown) in order from a semiconductor substrate 2 side. The upper guide layer has a diffraction grating structure functioning as a distributed feedback (DFB) structure.

The active layer 31 is, for example, a layer having a multiple quantum well structure of InGaAs/InAlAs. Each of the lower cladding layer 32 and the upper cladding layer 33 is, for example, a Si-doped InP layer. Each of the lower guide layer and the upper guide layer is, for example, a Si-doped InGaAs layer. The contact layer is, for example, a Si-doped InGaAs layer.

The semiconductor laminate 3 includes a ridge portion 30 extending along the Y-axis direction. The ridge portion 30 is formed of a portion on an opposite side of the lower cladding layer 32 from the semiconductor substrate 2, the lower guide layer, the active layer 31, the upper guide layer, the upper cladding layer 33, and the contact layer. A width of the ridge portion 30 in the X-axis direction is smaller than a width of the semiconductor substrate 2 in the X-axis direction. A length of the ridge portion 30 in the Y-axis direction is equal to a length of the semiconductor substrate 2 in the Y-axis direction. As one example, the length of the ridge portion 30 is approximately 2 mm, the width of the ridge portion 30 is approximately several μm to ten and several μm, and a thickness of the ridge portion 30 is approximately several μm. The ridge portion 30 is located at the center of the semiconductor substrate 2 in the X-axis direction. Each layer forming the semiconductor laminate 3 does not exist on both sides of the ridge portion 30 in the X-axis direction.

The semiconductor laminate 3 has a first end surface 3a and a second end surface 3b facing each other in a light waveguide direction A of the ridge portion 30. The light waveguide direction A is a direction parallel to the Y-axis direction that is an extending direction of the ridge portion 30. The first end surface 3a and the second end surface 3b function as light-emitting end surfaces. The first end surface 3a and the second end surface 3b are located on the same planes as those of both respective side surfaces of the semiconductor substrate 2 in the Y-axis direction.

The insulating film 4 is formed on side surfaces 30b of the ridge portion 30 and on a surface 32a of the lower cladding layer 32 such that a surface 30a on an opposite side of the ridge portion 30 from the semiconductor substrate 2 is exposed. The side surfaces 30b of the ridge portion 30 are both side surfaces of the ridge portion 30 facing each other in the X-axis direction. The surface 32a of the lower cladding layer 32 is a surface of a portion on an opposite side of the lower cladding layer 32 from the semiconductor substrate 2, the portion not forming the ridge portion 30. The insulating film 4 is, for example, a SiN film or a $SiO_2$ film.

The first electrode 5 is formed on a surface 3c on an opposite side of the semiconductor laminate 3 from the semiconductor substrate 2. The surface 3c of the semiconductor laminate 3 is a surface formed of the surface 30a of the ridge portion 30, the side surfaces 30b of the ridge portion 30, and the surface 32a of the lower cladding layer 32. When viewed in the Z-axis direction, an outer edge of the first electrode 5 is located inside outer edges of the semiconductor substrate 2 and the semiconductor laminate 3. The first electrode 5 is in contact with the surface 30a of the ridge portion 30 on the surface 30a of the ridge portion 30 and is in contact with the insulating film 4 on the side surfaces 30b of the ridge portion 30 and on the surface 32a of the lower cladding layer 32. Accordingly, the first electrode 5 is electrically connected to the upper cladding layer 33 through the contact layer.

The first electrode 5 includes a metal foundation layer 51 and a metal plating layer 52. The metal foundation layer 51 is formed to extend along the surface 3c of the semiconductor laminate 3. The metal foundation layer 51 is, for example, a Ti/Au layer. The metal plating layer 52 is formed on the metal foundation layer 51 such that the ridge portion 30 is embedded in the metal plating layer 52. The metal plating layer 52 is, for example, an Au plating layer. A surface 52a on an opposite side of the metal plating layer 52 from the semiconductor substrate 2 is a flat surface perpendicular to the Z-axis direction. As one example, the surface 52a of the metal plating layer 52 is a polished surface that is flattened by chemical mechanical polishing, and polishing marks are formed on surface 52a of the metal plating layer 52. Incidentally, the fact that the ridge portion 30 is embedded in the metal plating layer 52 means that the ridge portion 30 is covered with the metal plating layer 52 in a state where a thickness of portions of the metal plating layer 52 (thickness of the portions in the Z-axis direction) is larger than the thickness of the ridge portion 30 in the Z-axis direction, the portions being located on both sides of the ridge portion 30 in the X-axis direction.

The second electrode 6 is formed on a surface 2b on an opposite side of the semiconductor substrate 2 from the semiconductor laminate 3. The second electrode 6 is, for example, an AuGe/Au film, an AuGe/Ni/Au film, or an Au film. The second electrode 6 is electrically connected to the lower cladding layer 32 through the semiconductor substrate 2.

The insulating film 7 is continuously formed from the second end surface 3b of the semiconductor laminate 3 to a region 5r on a second end surface 3b side of a surface 5a of the first electrode 5 and to a region 6r on the second end surface 3b side of a surface 6a of the second electrode 6. The surface 5a is a surface on an opposite side of the first electrode 5 from the semiconductor laminate 3 (in the present embodiment, the surface 52a of the metal plating layer 52). The surface 6a is a surface on an opposite side of the second electrode 6 from the semiconductor substrate 2. In the present embodiment, the insulating film 7 is formed to extend along the second end surface 3b of the semiconductor laminate 3, along a region 3r on the second end surface 3b side of the surface 3c of the semiconductor laminate 3, along a side surface 5b on the second end surface 3b side of the first electrode 5, along the region 5r on the second end surface 3b side of the surface 5a of the first electrode 5, along a side surface 2c on the second end surface 3b side of the semiconductor substrate 2, along a side surface 6b on the second end surface 3b side of the second electrode 6, and along the region 6r on the second end surface 3b side of the surface 6a of the second electrode 6.

The metal film 8 is formed on the insulating film 7 to cover the active layer 31 when viewed in the light waveguide direction A (namely, to include the active layer 31 when viewed in the light waveguide direction A). In the present embodiment, the metal film 8 is formed only on the insulating film 7 to extend along the second end surface 3b of the semiconductor laminate 3, along the region 3r on the second end surface 3b side of the surface 3c of the semiconductor laminate 3, along the side surface 2c on the second end surface 3b side of the semiconductor substrate 2, along the side surface 6b on the second end surface 3b side of the second electrode 6, and along the region 6r on the second end surface 3b side of the surface 6a of the second electrode 6. An outer edge 80 of the metal film 8 does not reach the surface 5a of the first electrode 5 when viewed in the light waveguide direction A. In the present embodiment, a portion 80a on a first electrode 5 side of the outer edge 80 of the metal film 8 is located on the region 3r on the second end surface 3b side of the surface 3c of the semiconductor laminate 3, and a portion 80b on a second electrode 6 side of the outer edge 80 of the metal film 8 is located on the region 6r on the second end surface 3b side of the surface 6a of the second electrode 6.

A thickness of a portion of the metal film 8 formed on the second end surface 3b is larger than a thickness of a portion of the insulating film 7 formed on the second end surface 3b. A thickness of a portion of the first electrode 5 corresponding to the active layer 31 in the Z-axis direction is larger than a thickness of a portion of the metal film 8 formed on the second end surface 3b. The thickness of the portion of the insulating film 7 formed on the second end surface 3b is, for example, approximately 300 nm. The thickness of the portion of the metal film 8 formed on the second end surface 3b is, for example, approximately 500 nm. The thickness of the portion of the first electrode 5 corresponding to the active layer 31 in the Z-axis direction is, for example, 5 μm or more. Incidentally, when a thickness of a portion is not constant, the thickness of the portion means an average value of the thickness of the portion.

In the present embodiment, the insulating film 7 is an $Al_2O_3$ film or a $CeO_2$ film, and the metal film 8 is an Au film. When the semiconductor laminate 3 is configured to oscillate laser light having a center wavelength of any value of 4 to 7.5 μm, it is preferable that the insulating film 7 is an $Al_2O_3$ film having a property of transmitting light having a wavelength of 4 to 7.5 μm. When the semiconductor laminate 3 is configured to oscillate laser light having a center wavelength of any value of 7.5 to 11 μm, it is preferable that the insulating film 7 is a $CeO_2$ film having a property of transmitting light having a wavelength of 7.5 to 11 μm. When the semiconductor laminate 3 is configured to oscillate laser light having a center wavelength of any value of 4 to 11 μm, it is preferable that the metal film 8 is an Au film that effectively functions as a reflection film for reflecting light having a wavelength of 4 to 11 μm.

In the quantum cascade laser element 1 configured as described above, when a bias voltage is applied to the active layer 31 through the first electrode 5 and through the second electrode 6, light is emitted from the active layer 31, and light having a predetermined center wavelength of the light is oscillated in the distributed feedback structure. At this time, the metal film 8 formed on the second end surface 3b functions as a reflection film. Accordingly, the first end surface 3a functions as a light-emitting surface, and the laser light having the predetermined center wavelength is emitted from the first end surface 3a.

Method for Manufacturing Quantum Cascade Laser Element

A method for manufacturing the quantum cascade laser element 1 described above will be described with reference to FIGS. 3 and 4. First, as shown in (a) of FIG. 3, a wafer 100 including a plurality of portions 110 each of which becomes the quantum cascade laser element 1 is formed. In the wafer 100, the plurality of portions 110 are arranged in a matrix pattern in the X-axis direction as a row direction and in the Y-axis direction (namely, the light waveguide direction A of the portions 110 each of which becomes the quantum cascade laser element 1) as a column direction. As one example, the wafer 100 is manufactured by the following method.

Namely, a method for manufacturing the wafer 100 is a method including: a step of forming a semiconductor layer including a plurality of portions each of which becomes the semiconductor laminate 3 on a surface of a semiconductor wafer including a plurality of portions each of which becomes the semiconductor substrate 2; a step of removing a part of the semiconductor layer by etching such that the portions of the semiconductor layer each of which becomes the semiconductor laminate 3 include the ridge portions 30; a step of forming an insulating layer including a plurality of portions each of which becomes the insulating film 4 on the semiconductor layer such that the surface 30a of each of the ridge portions 30 is exposed; a step of forming a metal foundation layer including a plurality of portions each of which becomes the metal foundation layer 51, to cover the surface 30a of each of the ridge portions 30 and to cover the insulating layer; a step of forming a plurality of metal plating layers each of which becomes the metal plating layer 52 on the metal foundation layer and of embedding the ridge portion 30 in each of the metal plating layers; a step of flattening a surface of each of the metal plating layers by polishing; and a step of thinning the semiconductor wafer by polishing a back surface of the semiconductor wafer and of forming an electrode layer including a plurality of portions each of which becomes the second electrode 6 on the back surface of the semiconductor wafer.

Subsequently, as shown in (b) of FIG. 3, a plurality of laser bars 200 are obtained by cleaving the wafer 100 along the X-axis direction. In each of the laser bars 200, the plurality of portions 110 are one-dimensionally arranged along the X-axis direction. Each of the laser bars 200 has a pair of end surfaces 200a and 200b facing each other in the Y-axis direction. The end surface 200a includes a plurality of the first end surfaces 3a that are one-dimensionally arranged along the X-axis direction, and the end surface 200b includes a plurality of the second end surfaces 3b that are one-dimensionally arranged along the X-axis direction.

Subsequently, as shown in (a) of FIG. 4, an insulating layer 700 is formed on a surface of a portion 210 of the laser bar 200, the portion 210 including the end surface 200b, and a metal layer 800 is formed on the insulating layer 700. The insulating layer 700 is a layer including a plurality of portions each of which becomes the insulating film 7, and the metal layer 800 is a layer including a plurality of portions each of which becomes the metal film 8. Subsequently, as shown in (b) of FIG. 4, a plurality of the quantum cascade laser elements 1 are obtained by cleaving the laser bar 200 along the Y-axis direction.

The formation of the insulating layer 700 and the metal layer 800 on the laser bar 200 will be described with reference to FIG. 5. First, as shown in (a) of FIG. 5, a plurality of the laser bars 200 and a plurality of dummy bars 300 are prepared. A length of the dummy bars 300 in the Y-axis direction is smaller than a length of the laser bars 200 in the Y-axis direction. A length of the dummy bars 300 in the X-axis direction is equal to or larger than a length of the laser bars 200 in the X-axis direction.

Subsequently, in a state where the end surface 200a of each of the laser bars 200 and an end surface 300a of each of the dummy bars 300 (one end surface of each of the dummy bars 300 in the Y-axis direction) are located on the same plane, the laser bars 200 and the dummy bars 300 are alternately disposed to be adjacent to each other in the Z-axis direction, and the plurality of laser bars 200 and the plurality of dummy bars 300 are held by a holding member (not shown). Accordingly, the portion 210 of each of the laser bars 200 protrudes from an end surface 300b of the dummy bar 300 adjacent thereto (the other end surface of each of the dummy bars 300 in the Y-axis direction). The insulating layer 700 is formed on the surface of the portion 210 of each of the laser bars 200 by performing sputtering of $Al_2O_3$ or $CeO_2$ in this state.

Subsequently, as shown in (b) of FIG. 5, a plurality of dummy bars 400 are prepared. A length of the dummy bars 400 in the Y-axis direction is larger than the length of the dummy bars 300 in the Y-axis direction and is smaller than the length of the laser bars 200 in the Y-axis direction. A length of the dummy bars 400 in the X-axis direction is equal to or larger than the length of the laser bars 200 in the X-axis direction. Incidentally, in (b) of FIG. 5, the illustration of the insulating layer 700 formed on the surface of the portion 210 of each of the laser bars 200 is omitted.

Subsequently, in a state where the end surface 200a of each of the laser bars 200 and an end surface 400a of each of the dummy bars 400 (one end surface of each of the dummy bars 400 in the Y-axis direction) are located on the same plane, the laser bars 200 and the dummy bars 400 are alternately disposed to be adjacent to each other in the Z-axis direction, and the plurality of laser bars 200 and the plurality of dummy bars 400 are held by a holding member (not shown). Accordingly, a portion of the portion 210 of each of the laser bars 200 protrudes from an end surface 400b of the dummy bar 400 adjacent thereto (the other end surface of each of the dummy bars 400 in the Y-axis direction), the portion including the end surface 200b. The metal layer 800 is formed on the insulating layer 700 by performing sputtering of Au in this state. Incidentally, before the metal layer 800 is formed on the insulating layer 700 by sputtering after the laser bars 200 and the dummy bars 400 are alternately disposed, a plasma activation treatment may be applied to a surface of the insulating layer 700 by so-called reverse sputtering in which ionized inert gas atoms for sputtering (for example, Ar ions) are caused to collide with the surface of the insulating layer 700 by reversing the discharge polarity with respect to a discharge polarity of the sputtering for forming the metal layer 800. Accordingly, since the surface of the insulating layer 700 is cleaned, the adhesion of the metal layer 800 to the insulating layer 700 can be enhanced.

Configuration of Quantum Cascade Laser Device

Figure 6:
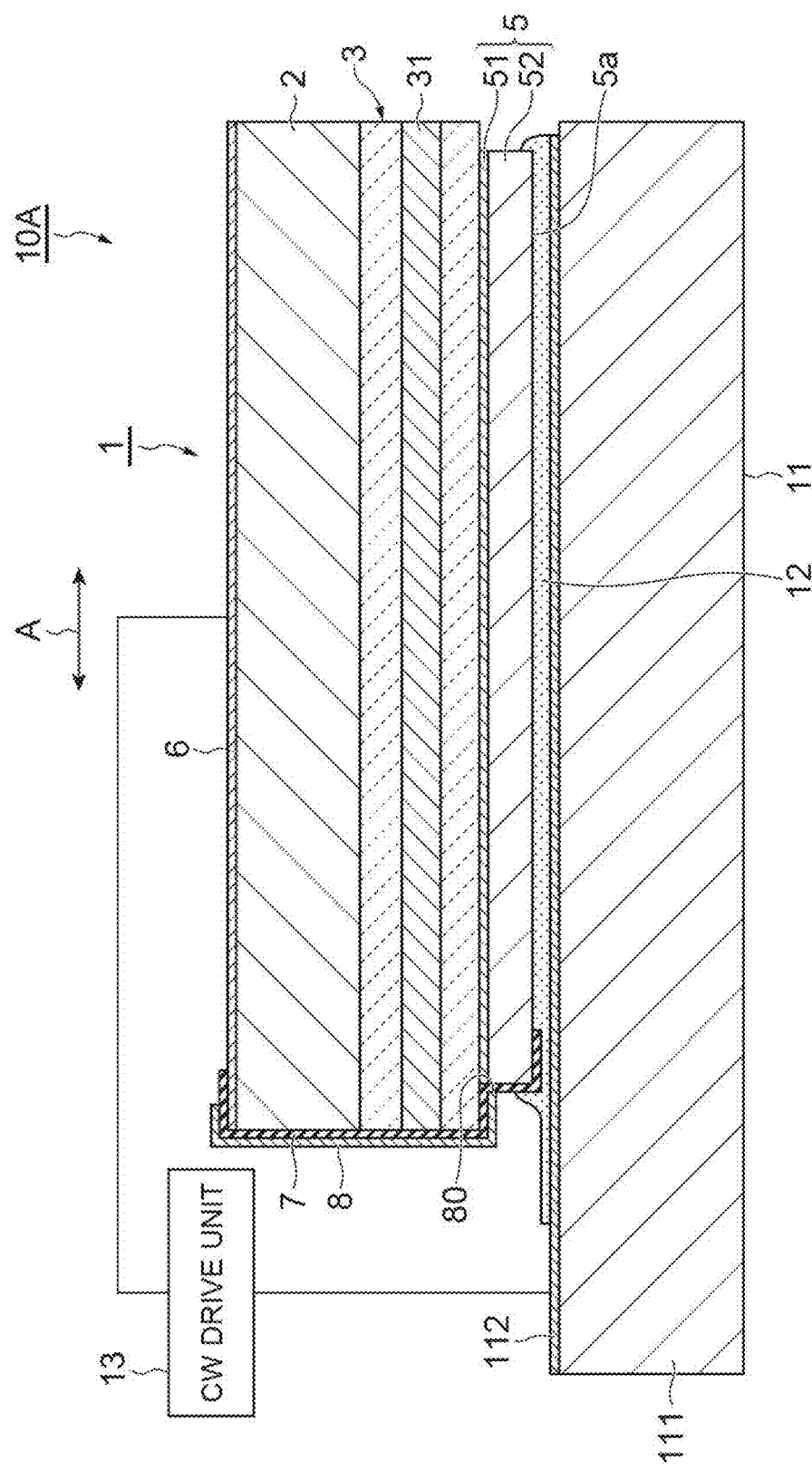
FIG. 6 is a cross-sectional view of a quantum cascade laser device including the quantum cascade laser element shown in FIG. 1.

A quantum cascade laser device 10A including the quantum cascade laser element 1 described above will be described with reference to FIG. 6. As shown in FIG. 6, the quantum cascade laser device 10A includes the quantum cascade laser element 1, a support portion 11, a joining member 12, and a CW drive unit (drive unit) 13.

The support portion 11 includes a body portion 111 and an electrode pad 112. The support portion 11 is, for example, a sub-mount in which the body portion 111 is made of AlN. The support portion 11 supports the quantum cascade laser element 1 in a state where the semiconductor laminate 3 is located on a support portion 11 side with respect to the semiconductor substrate 2 (namely, an epi-side-down state).

The joining member 12 joins the electrode pad 112 of the support portion 11 and the first electrode 5 of the quantum cascade laser element 1 in the epi-side-down state. The joining member 12 is, for example, a solder member such as an AuSn member.

In the quantum cascade laser device 10A, the joining member 12 causes the insulating film 7 to wrap around the surface 5a of the first electrode 5 joined to the electrode pad 112 of the support portion 11. However, the outer edge 80 of the metal film 8 does reach the surface 5a of the first electrode 5 when viewed in the light waveguide direction A.

The thickness of the portion of the first electrode 5 corresponding to the active layer 31 in the Z-axis direction is larger than a thickness of a portion of the joining member 12 disposed between the electrode pad 112 and the first electrode 5. The thickness of the portion of the first electrode 5 corresponding to the active layer 31 in the Z-axis direction is, for example, 5 μm or more. The thickness of the portion of the joining member 12 disposed between the electrode pad 112 and the first electrode 5 is, for example, approximately 2 to 3 μm.

The CW drive unit 13 drives the quantum cascade laser element 1 such that the quantum cascade laser element 1 continuously oscillates laser light. The CW drive unit 13 is electrically connected to each of the electrode pad 112 of the support portion 11 and the second electrode 6 of the quantum cascade laser element 1. In order to electrically connect the CW drive unit 13 to each of the electrode pad 112 and the second electrode 6, wire bonding is performed on each of the electrode pad 112 and the second electrode 6.

Actions and Effects

In the quantum cascade laser element 1, the metal film 8 is provided on the second end surface 3b of the first end surface 3a and the second end surface 3b included in the semiconductor laminate 3, with the insulating film 7 interposed therebetween. Accordingly, since the first end surface 3a functions as a light-emitting surface while the metal film 8 functions as a reflection film, an efficient light output is obtained. Further, the insulating film 7 is continuously formed from the second end surface 3b of the semiconductor laminate 3 to the region 5r on the second end surface 3b side of the surface 5a of the first electrode 5, and the outer edge 80 of the metal film 8 formed on the insulating film 7 does not reach the surface 5a of the first electrode 5 when viewed in the light waveguide direction A. Accordingly, in order to mount the quantum cascade laser element 1 on the support portion 11, when the first electrode 5 around which the insulating film 7 has wrapped is joined to the electrode pad 112 of the support portion 11 using the joining member 12, the molten joining member 12 is unlikely to reach the metal film 8. Moreover, heat generated in the active layer 31 is unlikely to be trapped, for example, as compared to a configuration in which the metal film 8 is covered with an insulating member. In addition, since the first electrode 5 around which the insulating film 7 has wrapped is joined to the electrode pad 112 of the support portion 11, the active layer 31 can be disposed closer to the support portion 11 as compared to when the second electrode 6 is joined to the electrode pad 112 of the support portion 11. Therefore, heat generated in the active layer 31 can be efficiently released to the support portion 11 side. For these reasons, the degradation of a light output characteristic of the quantum cascade laser element 1 is suppressed. As described above, according to the quantum cascade laser element 1, an efficient light output can be obtained while suppressing the degradation of the light output characteristic.

Incidentally, when the quantum cascade laser element 1 is mounted on the support portion 11, if the molten joining member 12 reaches the metal film 8, the molten joining member 12 rapidly spread on the metal film 8, which is a concern. If the molten joining member 12 spreads on the metal film 8, for example, Sn contained in the joining member 12 diffuses into the metal film 8, and the reliability of the quantum cascade laser element 1 decreases, which is a concern. In addition, if the molten joining member 12 adheres to the metal film 8, the metal film 8 peels off from the insulating film 7 because of the shrinkage of the joining member 12 during curing, which is a concern. According to the configuration of the insulating film 7 and the metal film 8 in the quantum cascade laser element 1, it is prevented that the molten joining member 12 adheres to the metal film 8 to cause a short circuit between the first electrode 5 and the second electrode 6, and the above-described situation is prevented from occurring.

In the quantum cascade laser element 1, the semiconductor laminate 3 includes the ridge portion 30. Accordingly, by the above-described configuration of the insulating film 7 and the metal film 8, a reduction in the drive current of the quantum cascade laser element 1 and a reduction in the electric power consumption of the quantum cascade laser element 1 can be achieved while suppressing an efficient light output. At this time, the light density on each of the first end surface 3a and the second end surface 3b increases by the amount that the active layer 31 is narrowed, but heat dissipation is secured by the above-described configuration of the insulating film 7 and the metal film 8, so that the degradation of the light output characteristic of the quantum cascade laser element 1 can be suppressed. In addition, damage to the insulating film 7 caused by heat can be suppressed.

In the quantum cascade laser element 1, the thickness of the portion of the metal film 8 formed on the second end surface 3b is larger than the thickness of the portion of the insulating film 7 formed on the second end surface 3b. Accordingly, heat dissipation on the second end surface 3b on which the insulating film 7 and the metal film 8 are formed can be improved as compared to when the thickness relationship is reversed.

In the quantum cascade laser element 1, the thickness of the portion of the first electrode 5 corresponding to the active layer 31 in the Z-axis direction is larger than the thickness of the portion of the metal film 8 formed on the second end surface 3b. Accordingly, when the first electrode 5 around which the insulating film 7 has wrapped is joined to the electrode pad 112 of the support portion 11, heat generated in the active layer 31 can be more efficiently released to the support portion 11 side.

In the quantum cascade laser element 1, the insulating film 7 is an $Al_2O_3$ film or a $CeO_2$ film. Accordingly, since the molten joining member 12 is unlikely to get wet to the insulating film 7, the molten joining member 12 can be more reliably prevented from reaching the metal film 8.

According to the quantum cascade laser device 10A, by the above-described configuration of the quantum cascade laser element 1, an efficient light output can be obtained while suppressing the degradation of the light output characteristic.

In the quantum cascade laser device 10A, the thickness of the portion of the first electrode 5 corresponding to the active layer 31 in the Z-axis direction is larger than the thickness of the portion of the joining member 12 disposed between the electrode pad 112 and the first electrode 5. Accordingly, when the quantum cascade laser element 1 is mounted on the support portion 11, the distance between the outer edge 80 of the metal film 8 and the surface 5a of the first electrode 5 when viewed in the light waveguide direction A can be sufficiently secured such that the molten joining member 12 can be more reliably prevented from reaching the metal film 8.

In the quantum cascade laser device 10A, the CW drive unit 13 drives the quantum cascade laser element 1 such that the quantum cascade laser element 1 continuously oscillates laser light. When the quantum cascade laser element 1 continuously oscillates laser light, the amount of heat generated in the active layer 31 is increased as compared to when the quantum cascade laser element 1 oscillates laser light in a pulsed manner, so that the above-described configuration of the quantum cascade laser element 1 is particularly effective.

Modification Examples

The present disclosure is not limited to the above-described embodiment. For example, a known quantum cascade structure can be applied to the active layer 31. In addition, a known stack structure can be applied to the semiconductor laminate 3. As one example, in the semiconductor laminate 3, the upper guide layer may not have a diffraction grating structure functioning as a distributed feedback structure.

In addition, when viewed in the Z-axis direction, an outer edge of the metal foundation layer 51 of the first electrode 5 may coincide with the outer edges of the semiconductor substrate 2 and the semiconductor laminate 3. Incidentally, when the outer edge of the metal foundation layer 51 of the first electrode 5 coincides with at least the first end surface 3a and the second end surface 3b when viewed in the Z-axis direction, heat dissipation on the first end surface 3a and on the second end surface 3b can be secured.

In addition, the insulating film 7 may be continuously formed from the second end surface 3b of the semiconductor laminate 3 to the region on the second end surface 3b side of at least one surface of the surface 5a of the first electrode 5 and the surface 6a of the second electrode 6, and in that case, the outer edge 80 of the metal film 8 may not reach the one surface when viewed in the light waveguide direction A. In addition, the metal film 8 may be formed on the insulating film 7 to cover at least the active layer 31 when viewed in the light waveguide direction A.

Figure 7:
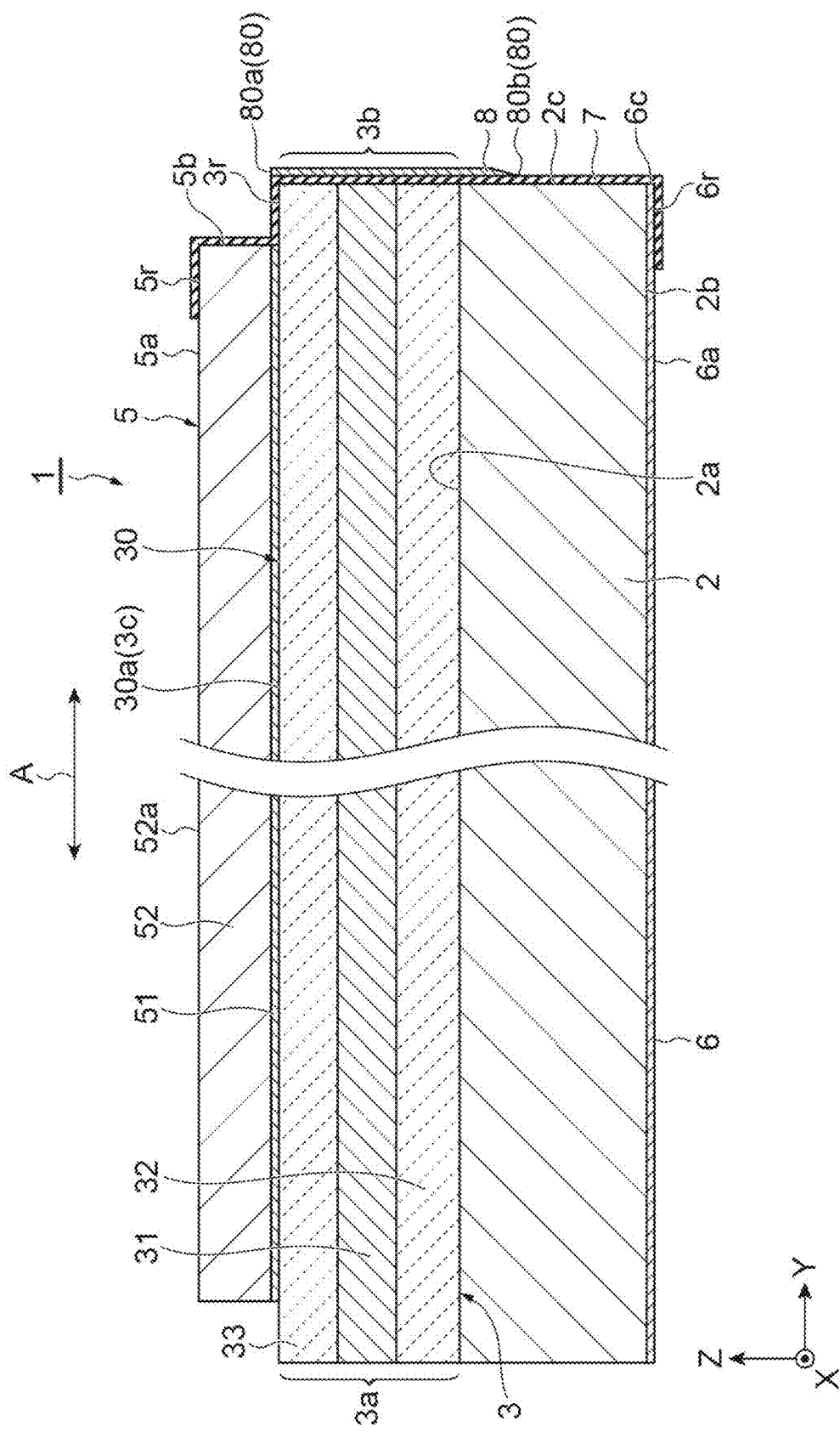
FIG. 7 is a cross-sectional view of a quantum cascade laser element according to a modification example.

As a modification example, as shown in FIG. 7, the outer edge 80 of the metal film 8 may reach neither the surface 5a of the first electrode 5 nor the surface 6a of the second electrode 6 when viewed in the light waveguide direction A. In the quantum cascade laser element 1 shown in FIG. 7, the metal film 8 is formed only on the insulating film 7 to extend along the second end surface 3b of the semiconductor laminate 3 and along the side surface 2c on the second end surface 3b side of the semiconductor substrate 2.

A method for manufacturing the quantum cascade laser element 1 shown in FIG. 7 is different from the method for manufacturing the quantum cascade laser element 1 shown in FIGS. 1 and 2 in a way of forming the insulating layer 700 and the metal layer 800 on the laser bar 200. As shown in (a) of FIG. 8, in the method for manufacturing the quantum cascade laser element 1 shown in FIG. 7, a plurality of the laser bars 200 and a plurality of the dummy bars 300 are prepared. A length of the dummy bars 300 in the Y-axis direction is smaller than a length of the laser bars 200 in the Y-axis direction. A length of the dummy bars 300 in the X-axis direction is equal to or larger than a length of the laser bars 200 in the X-axis direction.

Subsequently, in a state where the end surface 200a of each of the laser bars 200 and the end surface 300a of each of the dummy bars 300 are located on the same plane, the laser bars 200 and the dummy bars 300 are alternately disposed to be adjacent to each other in the Z-axis direction, and the plurality of laser bars 200 and the plurality of dummy bars 300 are held by a holding member (not shown). Accordingly, the portion 210 of each of the laser bars 200 protrudes from the end surface 300b of the dummy bar 300 adjacent thereto. The insulating layer 700 is formed on the surface of the portion 210 of each of the laser bars 200 by performing sputtering of $Al_2O_3$ or $CeO_2$ in this state.

Subsequently, as shown in (b) of FIG. 8, a plurality of dummy bars 500 are prepared. A length of the dummy bars 500 in the Y-axis direction is larger than the length of the laser bars 200 in the Y-axis direction. A length of the dummy bars 500 in the X-axis direction is equal to or larger than the length of the laser bars 200 in the X-axis direction. Incidentally, in (b) of FIG. 8, the illustration of the insulating layer 700 formed on the surface of the portion 210 of each of the laser bars 200 is omitted.

Subsequently, in a state where the end surface 200a of each of the laser bars 200 and an end surface 500a of each of the dummy bars 500 (one end surface of each of the dummy bars 500 in the Y-axis direction) are located on the same plane, the laser bars 200 and the dummy bars 500 are alternately disposed to be adjacent to each other in the Z-axis direction, and the plurality of laser bars 200 and the plurality of dummy bars 500 are held by a holding member (not shown). Accordingly, a portion of the portion 210 of each of the laser bars 200 is recessed with respect to an end surface 500b of the dummy bar 500 adjacent thereto (the other end surface of each of the dummy bars 500 in the Y-axis direction), the portion including the end surface 200b. The metal layer 800 is formed on the insulating layer 700 by obliquely performing sputtering of Au in this state. Incidentally, before the laser bars 200 and the dummy bars 500 are alternately disposed, a plasma activation treatment may be applied to a surface of the insulating layer 700 by so-called reverse sputtering in which ionized inert gas atoms for sputtering (for example, Ar ions) are caused to collide with the surface of the insulating layer 700 by reversing the discharge polarity with respect to a discharge polarity of the sputtering for forming the metal layer 800. Accordingly, since the surface of the insulating layer 700 is cleaned, the adhesion of the metal layer 800 to the insulating layer 700 can be enhanced.

In addition, the insulating film 7 is not limited to an $Al_2O_3$ film or a $CeO_2$ film, and the metal film 8 is not limited to an Au film. For example, the metal film 8 may be formed by stacking a Ti film and an Au film in order from an insulating film 7 side. In that case, a thickness of the Ti film is, for example, approximately 30 nm, and a thickness of the Au film is, for example, approximately 500 nm.

Figure 9:
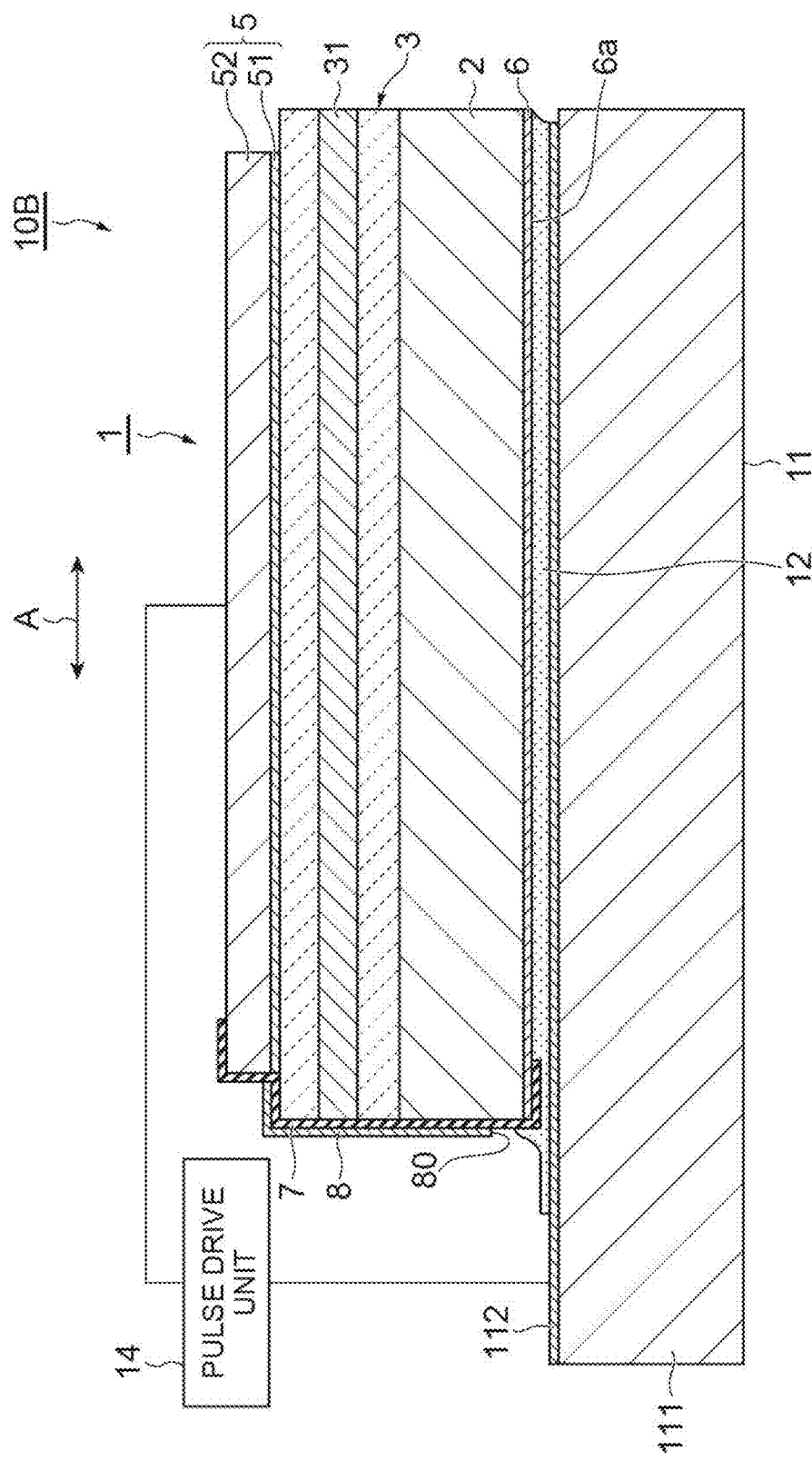
FIG. 9 is a cross-sectional view of a quantum cascade laser device according to a modification example.

In addition, as shown in FIG. 9, the quantum cascade laser element 1 may be mounted on the support portion 11 in a state where the semiconductor substrate 2 is located on the support portion 11 side with respect to the semiconductor laminate 3 (namely, an epi-side-up state). In the quantum cascade laser element 1 shown in FIG. 9, the joining member 12 causes the insulating film 7 to wrap around the surface 6a of the second electrode 6 joined to the electrode pad 112 of the support portion 11. However, the outer edge 80 of the metal film 8 does not reach the surface 6a of the second electrode 6 when viewed in the light waveguide direction A.

In the quantum cascade laser element 1 shown in FIG. 9, in order to mount the quantum cascade laser element 1 on the support portion 11, when the second electrode 6 around which the insulating film 7 has wrapped is joined to the electrode pad 112 of the support portion 11 using the joining member 12, the molten joining member 12 is unlikely to reach the metal film 8. Moreover, heat generated in the active layer 31 is unlikely to be trapped, for example, as compared to a configuration in which the metal film 8 is covered with an insulating member. For these reasons, the degradation of a light output characteristic of the quantum cascade laser element 1 is suppressed.

Hereinafter, a quantum cascade laser device 10B shown in FIG. 9 will be described. As shown in FIG. 9, the quantum cascade laser device 10B includes the quantum cascade laser element 1, the support portion 11, the joining member 12, and a pulse drive unit (drive unit) 14.

The support portion 11 includes the body portion 111 and the electrode pad 112. The support portion 11 is, for example, a sub-mount in which the body portion 111 is made of AlN. The support portion 11 supports the quantum cascade laser element 1 in the epi-side-up state.

The joining member 12 joins the electrode pad 112 of the support portion 11 and the second electrode 6 of the quantum cascade laser element 1 in the epi-side-up state. The joining member 12 is, for example, a solder member such as an AuSn member. A thickness of a portion of the joining member 12 disposed between the electrode pad 112 and the second electrode 6 is, for example, approximately several μm.

The pulse drive unit 14 drives the quantum cascade laser element 1 such that the quantum cascade laser element 1 oscillates laser light in a pulsed manner. A pulse width of the laser light is, for example, 50 to 500 ns, and a repetition frequency of the laser light is, for example, 1 to 500 kHz. The pulse drive unit 14 is electrically connected to each of the electrode pad 112 of the support portion 11 and the first electrode 5 of the quantum cascade laser element 1. In order to electrically connect the pulse drive unit 14 to each of the electrode pad 112 and the first electrode 5, wire bonding is performed on each of the electrode pad 112 and the first electrode 5.

Incidentally, in the quantum cascade laser device 10A shown in FIG. 6 and in the quantum cascade laser device 10B shown in FIG. 9, a heat sink (not shown) is provided on the support portion 11 side. For this reason, in a configuration in which the quantum cascade laser element 1 is mounted on the support portion 11 in the epi-side-down state (epi-side-down configuration shown in FIG. 6), heat dissipation of the semiconductor laminate 3 is easily secured as compared to a configuration in which the quantum cascade laser element 1 is mounted on the support portion 11 in the epi-side-up state (epi-side-up configuration shown in FIG. 9). Therefore, when the quantum cascade laser element 1 is driven to continuously oscillate laser light, the epi-side-down configuration is effective. Particularly, when the semiconductor laminate 3 is configured to oscillate laser light having a relatively short center wavelength (for example, a center wavelength of any value of 4 to 6 μm in a range of 4 to 11 μm) in the mid-infrared region and the quantum cascade laser element 1 is driven to continuously oscillate the laser light, the epi-side-down configuration is effective. However, depending on conditions or the like, in the epi-side-down configuration, the quantum cascade laser element 1 is not limited to being driven to continuously oscillate laser light, and in the epi-side-up configuration, the quantum cascade laser element 1 is not limited to being driven to oscillate laser light in a pulsed manner.

Various materials and shapes can be applied to each configuration in the above-described embodiment without being limited to the materials and shapes described above. In addition, each configuration in one embodiment or the modification examples described above can be arbitrarily applied to each configuration in another embodiment or modification example.

REFERENCE SIGNS LIST

1: quantum cascade laser element, 2: semiconductor substrate, 2b: surface, 3: semiconductor laminate, 3a: first end surface, 3b: second end surface, 3c: surface, 5: first electrode, 5a: surface, 5r: region, 6: second electrode, 6a: surface, 6r: region, 7: insulating film, 8: metal film, 10A, 10B: quantum cascade laser device, 11: support portion, 12: joining member, 13: CW drive unit (drive unit), 14: pulse drive unit (drive unit), 30: ridge portion, 31: active layer, 80: outer edge, 112: electrode pad, A: light waveguide direction.

The invention claimed is:

1. A quantum cascade laser element comprising:
a semiconductor substrate;
a semiconductor laminate formed on the semiconductor substrate to include an active layer having a quantum cascade structure and to have a first end surface and a second end surface facing each other in a light waveguide direction;
a first electrode formed on a surface on an opposite side of the semiconductor laminate from the semiconductor substrate;
a second electrode formed on a surface on an opposite side of the semiconductor substrate from the semiconductor laminate;
an insulating film continuously formed from the second end surface to a region on a second end surface side of at least one surface of a surface on an opposite side of the first electrode from the semiconductor laminate and a surface on an opposite side of the second electrode from the semiconductor substrate; and
a metal film formed on the insulating film to cover at least the active layer when viewed in the light waveguide direction,
wherein an outer edge of the metal film does not extend over the at least one surface of the surface of the first electrode and the surface of the second electrode when viewed in the light waveguide direction.

2. The quantum cascade laser element according to claim 1,
wherein the semiconductor laminate includes a ridge portion.

3. The quantum cascade laser element according to claim 1,
wherein a thickness of a portion of the metal film formed on the second end surface is larger than a thickness of a portion of the insulating film formed on the second end surface.

4. The quantum cascade laser element according to claim 1,
wherein the insulating film is continuously formed from the second end surface to at least a region on the second end surface side of the surface of the first electrode, and
the outer edge of the metal film does not reach the surface of the first electrode when viewed in the light waveguide direction.

5. The quantum cascade laser element according to claim 4,
wherein a thickness of a portion of the first electrode corresponding to the active layer in a thickness direction of the semiconductor substrate is larger than a thickness of a portion of the metal film formed on the second end surface.

6. The quantum cascade laser element according to claim 1,
wherein the insulating film is an $Al_2O_3$ film or a $CeO_2$ film.

7. A quantum cascade laser device comprising:
the quantum cascade laser element according to claim 1; and
a drive unit configured to drive the quantum cascade laser element.

8. The quantum cascade laser device according to claim 7, further comprising:
a support portion supporting the quantum cascade laser element; and
a joining member joining an electrode pad included in the support portion and the first electrode in a state where the semiconductor laminate is located on a support portion side with respect to the semiconductor substrate,
wherein the insulating film is continuously formed from the second end surface to at least a region on the second end surface side of the surface of the first electrode, and
the outer edge of the metal film does not reach the surface of the first electrode when viewed in the light waveguide direction.

9. The quantum cascade laser device according to claim 8,
wherein a thickness of a portion of the first electrode corresponding to the active layer in a thickness direction of the semiconductor substrate is larger than a thickness of a portion of the joining member disposed between the electrode pad and the first electrode.

10. The quantum cascade laser device according to claim 7,
wherein the drive unit drives the quantum cascade laser element such that the quantum cascade laser element continuously oscillates laser light.

* * * * *